United States Patent
Charlot et al.

(10) Patent No.: US 7,647,173 B2
(45) Date of Patent: Jan. 12, 2010

(54) DATA SERVER USED IN A SYSTEM FOR SUPPLYING AUGMENTATION DATA FOR THE SATELLITE NAVIGATION SIGNALS

(75) Inventors: Bernard Charlot, Toulouse (FR); Etienne Dunas, Toulouse (FR)

(73) Assignee: Alcatel Lucent, Paris (FR)

( * ) Notice: Subject to any disclaimer, the term of this patent is extended or adjusted under 35 U.S.C. 154(b) by 472 days.

(21) Appl. No.: 10/563,227

(22) PCT Filed: Jun. 28, 2004

(86) PCT No.: PCT/FR2004/001655

§ 371 (c)(1),
(2), (4) Date: Mar. 3, 2006

(87) PCT Pub. No.: WO2005/012938

PCT Pub. Date: Feb. 10, 2005

(65) Prior Publication Data

US 2006/0161347 A1 Jul. 20, 2006

(30) Foreign Application Priority Data

Jul. 4, 2003 (FR) .................................. 03 08167

(51) Int. Cl.
*G01S 5/00* (2006.01)
*G01S 1/00* (2006.01)
(52) U.S. Cl. .................. 701/214; 701/213; 342/357.06; 342/357.1; 342/357.12; 342/358
(58) Field of Classification Search .................. 701/213, 701/214, 215; 342/352, 353, 355, 357.01–357.17, 342/358; 340/947, 948, 979, 97
See application file for complete search history.

(56) References Cited

U.S. PATENT DOCUMENTS 5,365,447 A 11/1994 Dennis (Continued)

OTHER PUBLICATIONS

T. Walker, C. Kee, Y.C. Chao, Y.J. Tsai, U. Peled, J. Ceva, A.K. Barrows, E. Abbott, D. Powell, and B. Parkinson, "Flight Trials of the Wide-Area Augmentation System (WAAS)," Proceedings of the Annual Meeting of the Satellite Division of the Institute of Navigation (ION GPS-94), 1994.*

(Continued)

*Primary Examiner*—Thomas G Black
*Assistant Examiner*—Peter D Nolan
(74) *Attorney, Agent, or Firm*—Fay Sharpe LLP

(57) ABSTRACT

The invention relates to a data server (40) used in a system (10) for supplying complementary data, so-called augmentation data, for satellite navigation signals. The inventive server (40) is especially adapted to be used with elements that are compatible with those used in EGNOS technology (European Geostationary Navigation Overlay Service). Said system (10) for supplying augmentation data for the satellite navigation signals comprises at least one calculator (20) for the determination of said augmentation data, said augmentation data being determined from data transmitted by at least one receiving station (S01. . . S0N) receiving navigation information sent by means of at least one satellite. Said server (40) comprises a first inlet (401) for receiving the augmentation data transmitted by the calculator (20), a first outlet (402) for transmitting the augmentation data towards at least one user (U01. . . U0K), and a second outlet (403) for re-emitting the augmentation data towards the calculator (20) with a delay that is pre-determined in relation to the reception at the first inlet (401).

18 Claims, 4 Drawing Sheets

U.S. PATENT DOCUMENTS

| | | | | |
|---|---|---|---|---|
| 5,786,773 | A | * | 7/1998 | Murphy ........................ 340/947 |
| 6,078,960 | A | * | 6/2000 | Ballard ........................ 709/229 |
| 6,529,830 | B1 | * | 3/2003 | Eschenbach ................. 701/215 |
| 2002/0198657 | A1 | * | 12/2002 | Robbins ...................... 701/214 |

OTHER PUBLICATIONS

S.C. Lo, D. Akos, S. Houck, P.L. Normark, P. Enge, "WAAS Performance in the 2001 Alaska Flight Trials of the High Speed Loran Data Channel," Presented at the IEEE Position Location and Navigation Symposium, Palm Springs, CA, 2002.*

F. Toran-Marti, J. Ventura-Traveset, J.C. de Mateo, "Satellite Navigation & the Internet," Dr. Dobb's Journal, Mar., pp. 17-26, 2002.*

G. Crosby, W. Ely, K. McPherson, J. Stewart, D. Kraus, T. Cashin, K. Bean, B. Elrod, "A Ground-Based Regional Augmentation System (GRAS)—The Australian Proposal," Presented at ION GPS2000, Salt Lake City, UT, 2000.*

S.C. Lo, D. Akos, S. Houck, P.L. Normark, P. Enge, "WAAS Performance in the 2001 Alaska Flight Trials of the High Speed Loran Data Channel," Presented at the IEEE Position Location and Navigation Symposium, Palm Springs, CA, 2002.*

T. Walter, C. Kee, Y.C. Chao, Y.J. Tsai, U. Peled, J. Ceva, A.K. Barrows, E. Abbott, D. Powell, P. Enge, and B. Parkinson, "Flight Trials of the Wide-Area Augmentation System (WAAS)," Proceedings of the Annual Meeting of the Satellite Division of the Institute of Navigation (ION GPS-94), 1994.*

European Space Agency ESA, "Feet Sheet 5 SISNeT enhancing EGNOS for land mobile users", Dec. 1, 2002, pp. 1-2, XP002307790.

G.V. Loma; et al, Immarsat integrity channels for global navigation satellite systems, Proceedings of the National Telesystems Conference (NTC), Washington, May 19-20, 1992, New York, IEEE, US May 19, 1991, p. 3-5-3-8.

* cited by examiner

DATA SERVER USED IN A SYSTEM FOR SUPPLYING AUGMENTATION DATA FOR THE SATELLITE NAVIGATION SIGNALS

The present invention relates to a data server used in a system for supplying complementary data, known as augmentation data, for satellite navigation signals. The server of the invention is more particularly adapted to be produced with elements compatible with those used in the European Geostationary Navigation Overlay Service (EGNOS) technology.

The data supplied by Global Navigation Satellite Systems (GNSS) of the Global Positioning System (GPS) or GLONASS type are greatly enhanced by the use of the Satellite-Based Augmentation Systems (SBAS) technology. This technology provides further correction by satellite to the accuracy of the GPS, thereby very significantly augmenting the accuracy of position measurements. It also guarantees integrity and availability. SBAS satellite positioning accuracy augmentation systems are divided into three areas: EGNOS for Europe, WAAS for North America and MSAS for Japan.

Figure 1:
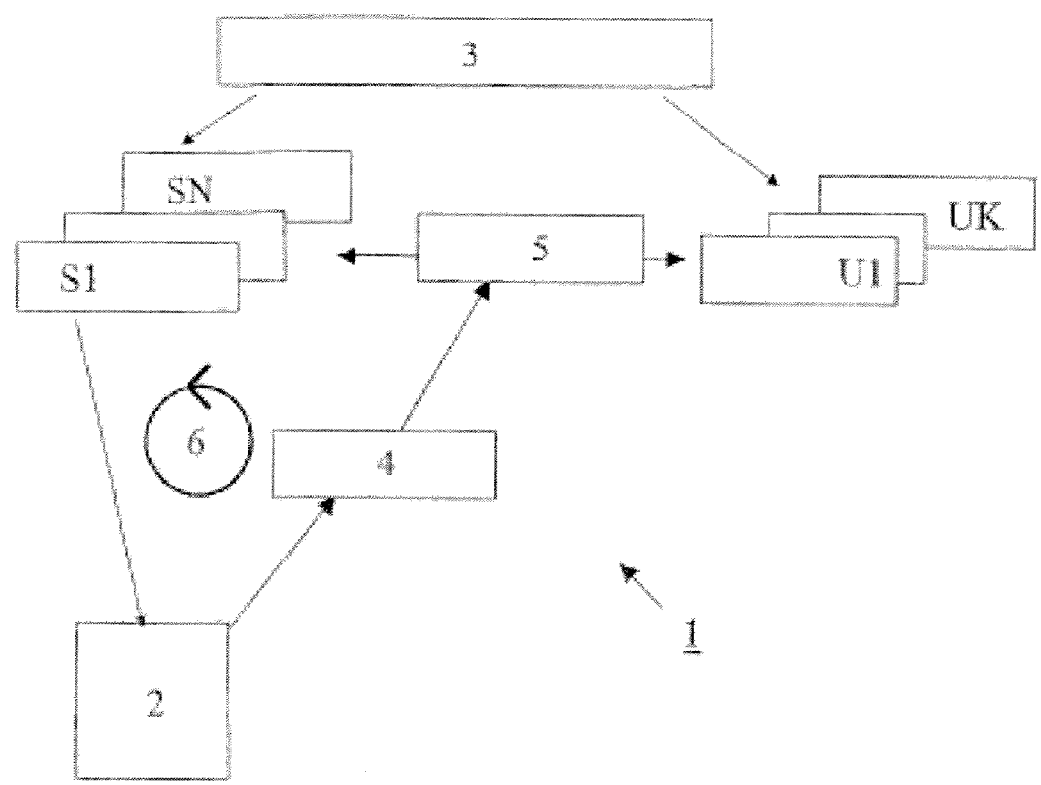

FIG. 1 is a diagram of a GPS satellite navigation system 1 using the EGNOS technology.

The system 1 includes:
a set 3 of GPS satellites,
receiver stations S1 to SN,
a computer 2,
a transmission station 4,
a geostationary satellite 5, and
users U1 to UK.

In the case of EGNOS, the receiver stations S1 to SN are Remote Integrity and Monitoring Stations (RIMS) of which there are currently 34.

The computer 2 is of the Central Process Facility (CPF) type. For clarity, only one computer 2 is shown, but there may equally well be several computers 2. Thus for the EGNOS, there are in reality five CPF providing redundancy in the event of a computation difference or equipment failure; at any given time, the five CPF are operating continuously. However, at any given time, only one CPF, called the active CPF, is supplying data.

The transmission station 4 is a Navigation Land Earth Station (NLES) that transmits the data from the active CPF, which it selects at intervals of one second from the five CPF, as a function of the indication as to the quality of the computations that the latter announce.

The geostationary satellite 5 is of the Inmarsat III or ARTEMIS type.

In concrete terms, the set 3 of GPS satellites sends position data to the receiver stations S1 to SN. The latter transmit the data to the computer 2 in particular. There, the data, called augmentation data, is computed by the computer 2. The augmentation data enables the following functions to be provided, for example:
differential basic corrections: broadcasting of ephemerides and clock corrections relative to the set 3 of GPS satellites,
differential precise corrections: broadcasting of ionosphere corrections relating to the set 3 of GPS satellites,
integrity (see below).

The augmentation data is combined before it is sent to the transmitter station 4 that transmits the data to the geostationary satellite 5.

The geostationary satellite 5 redistributes the augmentation data to the users U1 to UK, who also receive navigation signals from the set 3 of GPS satellites. The navigation signals combined with the augmentation data enable a user to determine his position with enhanced accuracy.

The augmentation data must be supplied by the computer 2 with a certain integrity, i.e. a capacity to supply augmentation data indicating to users with a high probability that the augmentation data is reliable and usable, thereby inducing a high level of security, compatible with the quantified data determined by the civil aviation authorities.

To transmit the integrity data, the computer 2 needs to receive in return and in real time all of the data that it transmits continuously to the users. If this is not the case, the computer declares itself non-integrated. Thus the computer itself verifies the data that it sends. In the case of EGNOS, and as shown in FIG. 1, the CPF computer 2 receives the data that it sends itself via the geostationary satellite 5 which retransmits the data to the CPF 2 via the RIMS receiver stations S1 to SN. The path of the data therefore corresponds to a loop 6, called the integrity loop. The geostationary satellite 5, which transmits in the L band (1.6/1.4 GHz), therefore has a two-fold function, firstly, transmitting the augmentation data to the users and, secondly, providing the integrity loop 6.

However, a solution of the above kind using a geostationary satellite to provide the integrity loop is subject to certain constraints or difficulties.

The cost of a geostationary satellite is prohibitive.

A certain number of countries wishing to evaluate the service gain by using an EGNOS type SBAS system have no geostationary satellite available.

A solution of the above kind imposes the broadcasting of augmentation data to users via the geostationary satellite and not via other broadcasting means.

The present invention aims to provide a system for supplying complementary data, called augmentation data, for satellite navigation signals, said system offering the opportunity to broadcast augmentation data by various broadcasting means without modifying or interfering with the augmentation data computer, the integrity of the system being assured without using a geostationary satellite or without having to receive what a geostationary navigation satellite broadcasts to retransmit it differently, and therefore with a delay.

To this end the present invention proposes a data server used in a system for supplying complementary data, called augmentation data, for satellite navigation signals, called user signals, said system including at least one computer for determining said augmentation data, which is determined from data transmitted by at least one receiver station receiving navigation information sent by at least one satellite, said server being characterized in that it has:
a first input for receiving said augmentation data transmitted by said computer,
a first output for sending said augmentation data to at least one user,
a second output for retransmitting said augmentation data to said computer with a predetermined time-delay relative to reception at said first input.

Thanks to the invention, the augmentation data server provides the integrity loop. From its second output, the server feeds augmentation data back to the computer by simulating a transmission delay such as would have been induced by the presence of a geostationary satellite. As a result, the computer operates in the same way as with a geostationary satellite, but without the presence of the latter being necessary, and does not necessitate any modification compared to the versions qualified (and where applicable certified) by the various players.

Moreover, the first output of the server transmits the augmentation data to various broadcasting means such as the INTERNET, for example. The system of the invention therefore derives the augmentation data from a Satellite-Based Augmentation Systems (SBAS) type system, to supply it to a user without modifying the SBAS computer.

Said server advantageously has a third output for retransmitting at least part of said augmentation data to said computer at the same time as sending said augmentation data to the user via said first output.

Said server advantageously has a second input for receiving information data coming from at least one user.

Said server advantageously includes means for particularizing said augmentation data sent via said first output as a function of said information data coming from at least one user.

It is particularly advantageous if said server is assigned an available geostationary satellite identification number.

Said server is advantageously assigned a virtual receiver station number.

In one embodiment, said augmentation data is determined from data transmitted by a plurality of receiver stations, said server having a third input for receiving data transmitted by one of said receiver stations.

The invention also provides a system for supplying complementary data, called augmentation data, for satellite navigation signals, called user signals, said system including at least one computer for determining said augmentation data, which is determined from data transmitted by at least one receiver station receiving navigation information sent by at least one satellite, said system being characterized in that it includes at least one data server according to the invention.

One advantageous embodiment of said system includes a plurality of computers for determining said augmentation data, said augmentation data server including means for selecting a computer from said plurality of computers, said second output of said server retransmitting said augmentation data received from said selected computer to said plurality of computers with a predetermined time-delay relative to the reception of said augmentation data.

Said augmentation data retransmitted to said plurality of computers advantageously includes an identifier of said selected computer.

Said selection is advantageously repeated cyclically on each reception of said augmentation data by said server.

One particularly advantageous embodiment of said system includes at least one active first augmentation data server and one redundant second augmentation data server, said computer transmitting said augmentation data to said first input of said active server, and not transmitting said augmentation data to said first input of said redundant server, and said computer including means for inverting the roles of said first and second servers, said second server becoming the active server and said first server becoming the redundant server.

Said means for reversing the roles of said first and second servers are advantageously commanded cyclically on each sending of said augmentation data.

Said system includes broadcasting means connected to said first output of said server to broadcast said augmentation data to the users.

Said broadcasting means advantageously consist of the Internet.

One particularly advantageous embodiment of said system includes routing and broadcasting means, said augmentation data being determined from data transmitted by a plurality of receiver stations and then routed and broadcast to said computer by said routing and broadcasting means, said augmentation data retransmitted by said server being also routed and broadcast to said computer by said routing and broadcasting means.

Said system advantageously includes a plurality of augmentation data servers.

Other features and advantages of the present invention will become apparent in the following description of illustrative and nonlimiting embodiments of the invention.

Figure 2:
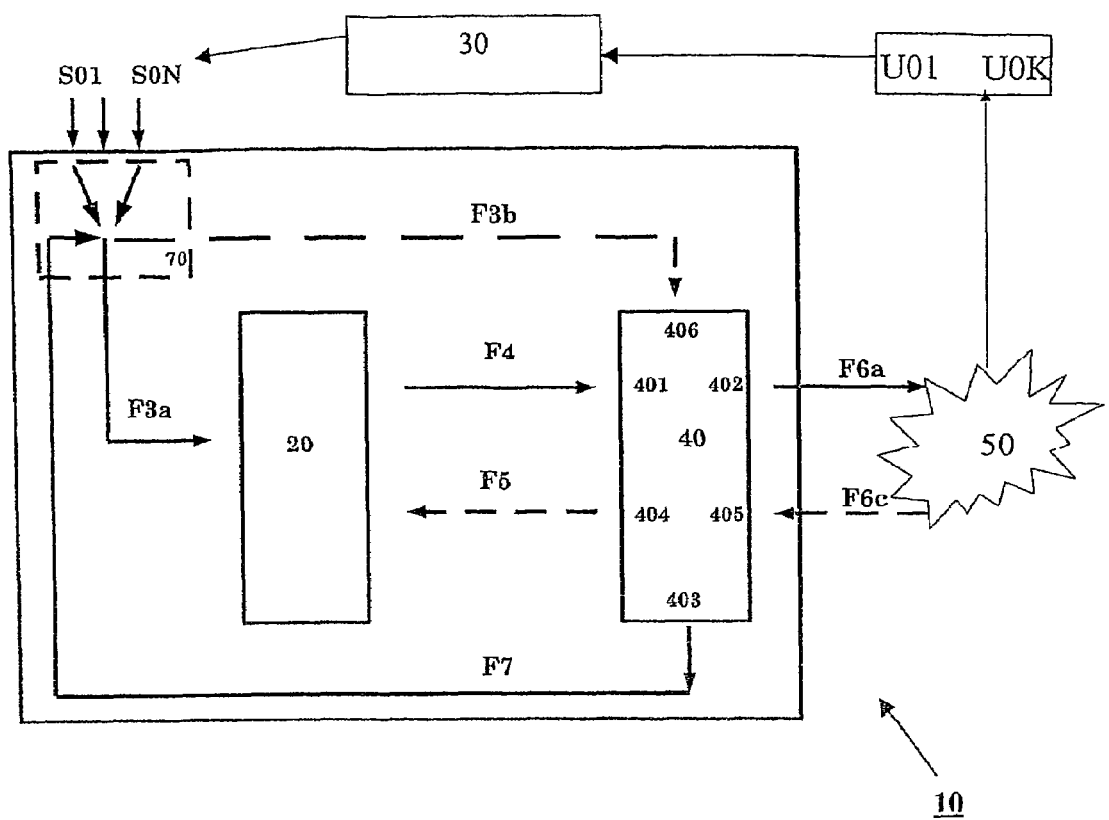
Figure 3:
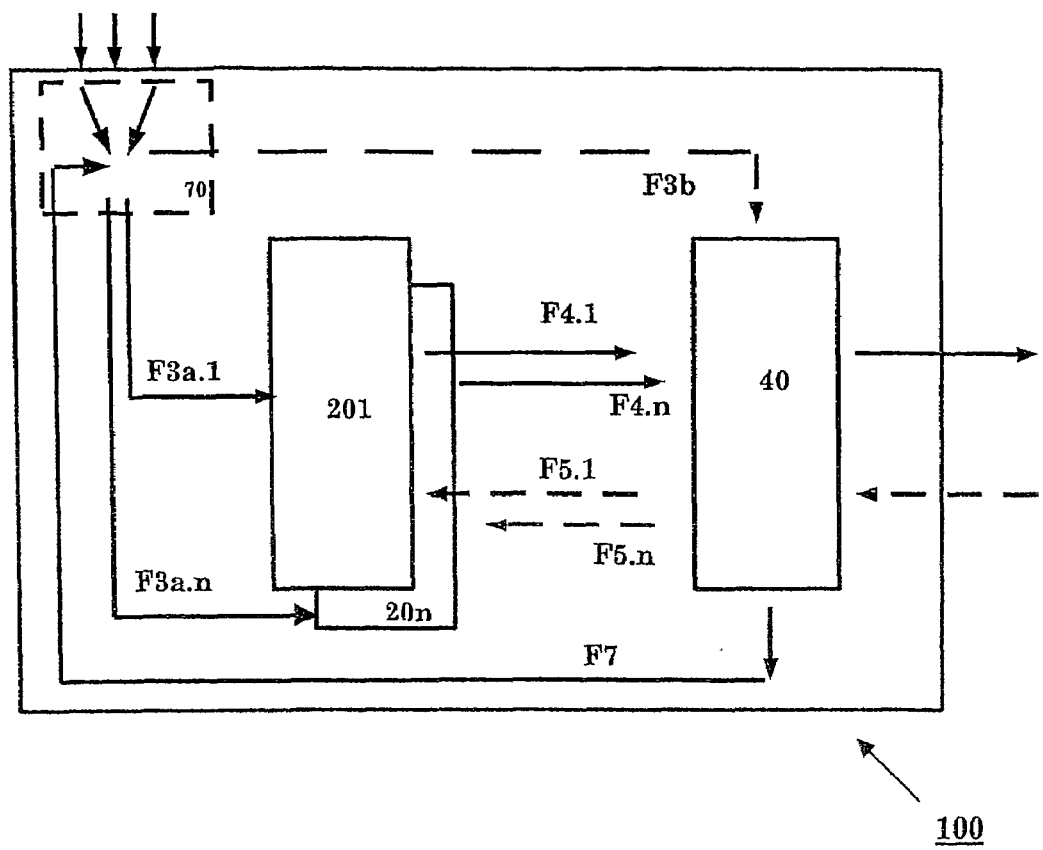
Figure 4:
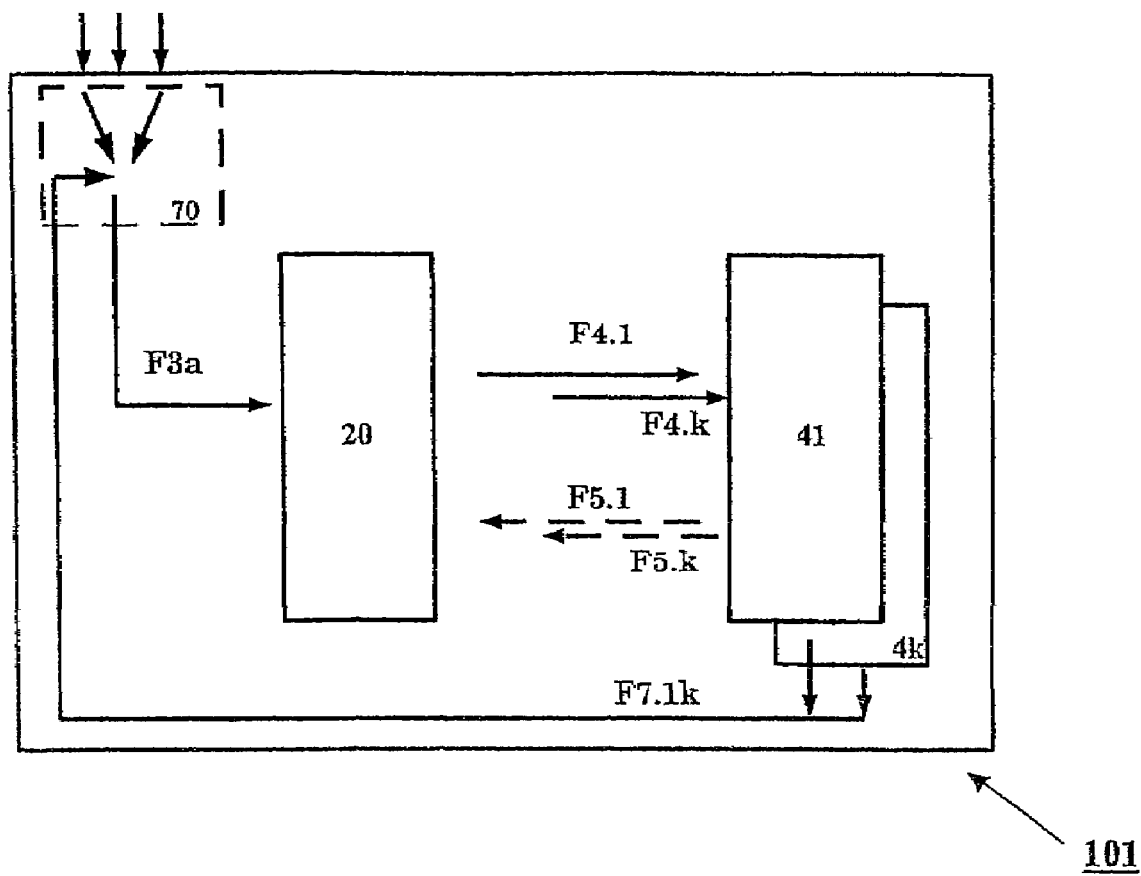

In the following figures:

FIG. 1 is a diagram of a prior art satellite navigation system for supplying augmentation data, FIG. 2 is a diagram of a system for supplying augmentation data for satellite navigation signals in accordance with a first embodiment of the invention, FIG. 3 is a diagram of a system for supplying augmentation data for satellite navigation signals in accordance with a second embodiment of the invention, FIG. 4 is a diagram of a system for supplying augmentation data for satellite navigation signals in accordance with a third embodiment of the invention.

In all the figures, common elements carry the same reference numbers.

FIG. 1 has already been described with reference to the prior art.

The following description of the three embodiments shown in FIGS. 1 to 3 relates to the EGNOS technology, but may be adapted to other technologies such as the WAAS technology and the MSAS technology.

FIG. 2 is a diagram of a system 10 for supplying augmentation data for satellite navigation signals in accordance with a first embodiment of the invention.

The system 10 includes:
 a set 30 of GPS satellites,
 receiver stations S01 to S0N,
 a computer 20,
 an augmentation data server 40 of the invention,
 routing and broadcasting means 70,
 broadcasting means 50,
 users U01 to U0K.

In the case of EGNOS, the receiver stations S01 to SON are Remote Integrity and Monitoring Stations (RIMS), of which there are currently 34.

The computer 20 is of the Central Process Facility (CPF) type.

The server 40 has:
 a first input 401,
 a second input 405,
 a third input 406,
 a first output 402,
 a second output 403,
 a third output 404.

The system 10 broadcasts navigation information using its satellites 30. That information is received by the N receiver stations S01 to SON.

Each of those stations S01 to SON transmits every second the data received (GPS navigation message, etc.) and measured (pseudo-distances, etc.) to the central processing facility (CPF) type computer 20 as shown by the arrow F3a as well as (optionally) to the third input 406 of the server 40, as shown by the arrow F3b. The data transmitted by the receiver stations S01 to SON is routed and broadcast as shown by the arrows F3a and F3b by the routing and broadcasting means 70. The data is in a first message format adapted to the EGNOS technology. A plurality of messages of the above type are transmitted every second by each station to the computer 20.

The computer 20 determines the navigation corrections to be applied and the associated integrity information and transmits them to the first input 401 of the server 40 as shown by the arrow F4. This data is referred to as augmentation data hereinafter.

The computer 20 considers the server 40 to be a virtual NLES type transmission station to a virtual geostationary satellite. Note that an identification number (PRN) of that virtual satellite is used, selected from those not reserved for other purposes (the reservation table is managed in accordance with the appendix of the RTCA standardization document MOPS D0229).

The augmentation data is transmitted to the server 40 like a set of messages using a second message format adapted to the EGNOS technology.

The server 40 receives these messages first, extracts the navigation overlay frame (NOF) navigation method contained in the received message and transmits the navigation message corresponding to the augmentation data from its first output 402 to the broadcasting means 50.

The broadcasting means 50 broadcast the message to the users U01 to U0K. The broadcasting means 50 consist of the Internet, for example. This transmission generally necessitates encapsulation of the NOF message in a message, joining to it the elements necessary for the transmission protocol layers used. Note, however, that other broadcasting means may equally be used.

The users therefore receive this NOF message as well as GPS signals and can use both kinds of information to compute a corrected GPS navigation solution and verify its integrity using the corrections contained in the NOF messages received over time.

To assure correct operation of the computer 20, it is important for the computer 20 to return the NOF message transmitted to the users U01 to UON.

This is assured by simulating a transmission delay as would be caused by a geostationary satellite. This is assured by the server 40 which sends from its second output 403 to the computer 20, as shown by the arrow F7, the NOF message transmitted to users encapsulated in a message using a third message format adapted to the EGNOS technology. The NOF message is sent back with a predetermined time-delay relative to the reception at the first input 401 of the augmentation data from the computer 20. That time-delay is equal to 1150 milliseconds, for example, starting from reception of the augmentation data from the computer 20. The NOF message sent back passes in transit through the routing and broadcasting means 70 which are responsible for transmitting the message to the computer 20 as shown by the arrow F3a.

This therefore simulates the reception of the NOF message by a virtual RIMS receiver station receiving data only from the server 40 corresponding to a virtual geostationary satellite. The integrity loop necessary for correct operation of the computer 20 is provided by the path F4-F7-F3a.

Note that there may equally be used instead a real (i.e. not virtual) RIMS receiver station number, corresponding to one of the receiver stations S01 to SON. In this case, the server 40 receives information from that real station as shown by the arrow F3b and mixes the received information with the NOF message before sending the combination to the computer 20.

Another loop that may be used assures fast return to the computer 20 of the NOF message transmitted to users. This is assured by the server 40 which sends to the computer 20, as shown by the arrow F5, from its third output 404, and immediately after sending the NOF message to the users, the same NOF message encapsulated in a message using a fourth format adapted to the EGNOS technology.

The server 40 can take another data stream into account: the arrow F6c corresponds to a return to the second input 405 of the server 40 of information coming from a user or a user group. This stream authorized by the invention does not exist in the diagram of the prior art augmentation system using a geostationary satellite. The stream may optionally be used by the server 40 for two purposes:

Modifying its behavior in relation to users and therefore the subsequent content of the messages transmitted as shown by the arrow F6a, Modifying its behavior in relation to the computer 20 and therefore the subsequent content of messages transmitted as shown by the arrows F7 and F5.

The server 40 includes software means for implementing the data exchange algorithm.

One example of the above kind of algorithm is given below:
Repeat for Each Second GPS Number n, Denoted $S_n$ Step 1: Before $S_n$+150 milliseconds, encapsulate the NOF $(S_{n-1})$ in a message to the appropriate format, and send it to the computer 20.

Step 2: Receive the per-second augmentation data $S_n$.

Step 3: Extract the NOF($S_n$) message from said augmentation data and store it for the next cycle.

Step 4: Encapsulate the NOF($S_n$) in a message with the format adopted to the broadcast interface used (for example the Internet) and send it to users.

Step 5: Encapsulate the NOF($S_n$) in a message with the appropriate format and send it to the computer 20 (note that the EGNOS implementation also entails sending back the NOF messages of the three preceding cycles).

NOF($S_n$) and NOF($S_{n-1}$) respectively denote the NOF messages corresponding to the augmentation data received at the input 401 of the server 40 at the seconds $S_n$ and $S_{n-1}$ and transmitted by the computer 20.

FIG. 3 is a diagram of a system 100 for supplying augmentation data for satellite navigation signals in accordance with a second embodiment of the invention.

The system 100 differs from the system shown in FIG. 2 only in that it includes a plurality of n computers 201 to 20n.

For clarity, the GPS satellites, the receiver stations, the broadcasting means and the users are not shown.

The computers 201 to 20n receive at intervals of one second navigation data coming from receiver stations as shown by the arrows F3a.l to F3a.n.

After processing by the computers 201 to 20n, augmentation data is transmitted by the computers 201 to 20n to the server 40 as shown by the arrows F4.1 to F4.n, respectively.

The server 40 includes means for selecting an NOF message corresponding to the augmentation data received from a selected computer. After encapsulation in an appropriate format, the NOF message is sent to users and sent back to the set of computers 201 to 20n with a predetermined time-delay, as shown by the arrow F7.

The algorithm providing the selection means may be based on the presence of, for example:

an integrity flag in the messages received from the computers, indicating if the sender of the message considers the computer to be integrated, a flag in the messages received from the computers indicating if the computer considers itself to have been selected by the server 40, of a quality of service (QoS) value in the messages received from the computers.

Fast return of the NOF message transmitted to the users to the computers 201 to 20n is equally possible, as shown by the arrows F5.1 to F5.n, respectively.

FIG. 4 is a diagram of a system 101 for supplying augmentation data for satellite navigation signals conforming to a third embodiment of the invention.

The system 101 differs from the system shown in FIG. 2 only in that it includes a plurality k of servers 41 to 4k of the invention. The k servers 41 to 4k are grouped into pairs, for example: this type of system is useful in particular for enhancing system availability and continuity.

Consider here the example of only one pair, i.e. k=2.

Each server 41 and 42 of the pair receives at intervals of one second messages from the computer 20 as shown by the arrows F4.1 and F4.2, respectively.

Only one of the two servers 41 (called the active server) of the pair receives from the computer 20 messages containing the NOF message to be transmitted to the users. The other server 42 (which is called the redundant server) receives a message containing no NOF message.

Each NOF message is retransmitted to the computer 20 as shown by the arrow F7.1k.

In each one-second cycle, the computer may decide to switch between the two servers 41 and 42 of the pair to activate that which was previously not activated.

To function in this way, each server must incorporate an algorithm that manages the change from an active mode to a redundant mode.

The fast returns shown by the arrows F5.1 and F5.2 are used to communicate the active or redundant mode of the server to the computer 20.

Of course, the invention is not limited to the embodiments that have just been described.

In particular, there may equally be envisaged a system including at one and the same time a plurality of computers and a plurality of servers.

Moreover, the invention is not limited to the EGNOS technology and may be transposed to other technologies such as the WAAS and MSAS technologies.

Finally, referring to FIG. 1, the server 40 has been described as able to receive information from a real station as shown by the arrow F3b and able to mix that received information with the NOF message before sending the combination to the computer 20. The information received from a real receiver station may also be transmitted directly to the users from the first output 402 of the server 40.

The invention claimed is:

1. A data server used in a system for supplying complementary augmentation data for satellite navigation user signals, said system including at least one computer for determining said augmentation data, which is determined from data transmitted by at least one receiver station receiving navigation information sent by at least one satellite, said server comprising:
   a first input for receiving said augmentation data transmitted by said computer;
   a first output for sending said augmentation data to at least one user; and
   a second output for retransmitting said augmentation data to said computer with a predetermined time-delay relative to reception at said first input wherein said predetermined time-delay simulates a transmission delay as would be caused by a geostationary satellite.

2. A server according to claim 1, comprising a third output for retransmitting at least part of said augmentation data to said computer at the same time as sending said augmentation data to the user via said first output.

3. A server according to claim 1, comprising a second input for receiving information data coming from the at least one user.

4. A server according to claim 3, wherein said server is adapted to particularize said augmentation data sent via said first output as a function of said information data.

5. A server according to claim 1, wherein said server is assigned an available geostationary satellite identification number.

6. A server according to claim 1, wherein said server is assigned a virtual receiver station number.

7. A server according to claim 1, wherein said augmentation data is determined from data transmitted by a plurality of receiver stations, said server comprising a third input for receiving data transmitted by one of said receiver stations.

8. A system for supplying complementary augmentation data for satellite navigation user signals, said system comprising:
   at least one computer for determining said augmentation data from data transmitted by at least one receiver station receiving navigation information sent by at least one satellite, and
   at least one data server comprising:
      a first input for receiving said augmentation data transmitted by said at least one computer;
      a first output for sending said augmentation data to at least one user; and
      a second output for retransmitting said augmentation data to said at least one computer with a predetermined time-delay relative to reception at said first input wherein said predetermined time-delay simulates a transmission delay as would be caused by a geostationary satellite.

9. A system according to claim 8, comprising a plurality of computers for determining said augmentation data;
   wherein said augmentation data server is adapted to select a computer from said plurality of computers;
   wherein said second output retransmits said augmentation data received from said selected computer to said plurality of computers with a predetermined time-delay relative to the reception of said augmentation data.

10. A system according to claim 9, wherein said augmentation data retransmitted to said plurality of computers includes an identifier of said selected computer.

11. A system according to claim 9, wherein said selection is repeated cyclically on each reception of said augmentation data by said server.

12. A system according to claim 8, comprising at least one active first augmentation data server and one redundant second augmentation data server;
   wherein said computer transmits said augmentation data to said first input of said active server, and does not transmit said augmentation data to said first input of said redundant server; and
   wherein said computer is adapted to invert the roles of said first and second servers, said second server becoming the active server and said first server becoming the redundant server.

13. A system according to claim 12, wherein said computer is adapted to invert the roles of said first and second servers cyclically on each sending of said augmentation data.

14. A system according to claim 8, comprising a broadcaster connected to said first output of said server to broadcast said augmentation data to the users.

15. A system according to claim 14, wherein said broadcaster is the internet.

16. A system according to claim 8, comprising a router-broadcaster, said augmentation data being determined from data transmitted by a plurality of receiver stations and then routed and broadcast to said computer by said router-broadcaster, said augmentation data retransmitted by said server being also routed and broadcast to said computer by said router-broadcaster.

17. A system according to claim 8, comprising a plurality of augmentation data servers.

18. A system for supplying complementary augmentation data for satellite navigation user signals, said system comprising:
- at least one computer for determining said augmentation data from data transmitted by at least one receiver station receiving navigation information sent by at least one satellite, and
- at least one data server comprising:
  - a first input for receiving said augmentation data transmitted by said at least one computer;
  - a third input for receiving data transmitted by one of said at least one receiver station;
  - a first output for sending said augmentation data to at least one user; and
  - a second output for retransmitting said augmentation data to said at least one computer with a predetermined time-delay relative to reception at said first input, wherein said predetermined time-delay simulates a transmission delay as would be caused by a geostationary satellite, wherein said second output retransmits said augmentation data using a receiver station number corresponding to the one of said at least one receiver station.

* * * * *